United States Patent
Liao (10) Patent No.: US 8,103,994 B2
(45) Date of Patent: Jan. 24, 2012

(54) GENERATING CUTTING FORMS ALONG CURRENT FLOW DIRECTION IN A CIRCUIT LAYOUT

(75) Inventor: Hongmei Liao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 569 days.

(21) Appl. No.: 12/352,782

(22) Filed: Jan. 13, 2009

(65) Prior Publication Data

US 2010/0179679 A1    Jul. 15, 2010

(51) Int. Cl.
*G06F 17/50*    (2006.01)
(52) U.S. Cl. ...................................................... 716/100
(58) Field of Classification Search ................... 716/100
See application file for complete search history.

(56) References Cited

U.S. PATENT DOCUMENTS

| | | | | |
|---|---|---|---|---|
| 5,671,152 | A * | 9/1997 | Lavin et al. ................... | 716/119 |
| 6,094,812 | A * | 8/2000 | English et al. .................. | 29/852 |
| 2002/0074660 | A1 * | 6/2002 | Fukasawa ...................... | 257/758 |
| 2003/0015800 | A1 * | 1/2003 | Fukasawa ...................... | 257/758 |
| 2003/0067075 | A1 * | 4/2003 | Fukasawa ...................... | 257/758 |
| 2004/0019871 | A1 * | 1/2004 | Morita ............................ | 716/19 |
| 2004/0255259 | A1 * | 12/2004 | Tan et al. ......................... | 716/11 |
| 2011/0019494 | A1 * | 1/2011 | Tsuda et al. ................. | 365/225.7 |

OTHER PUBLICATIONS

David Scagnelli et al.: "Pattern Density Methodology Using IBM Foundry Technologies," Electronic Components and Technology Conference, 2007. ECTC 07. Proceedings. 57th, IEEE, May 1, 2007, pp. 1300-1307. XP31180664.

Hong Cai et al.: "In-Pattern Dummy Design and Copper ECD/CMP Process Co-Optimization," 2007 Twelfth International Chemical-Mechanical Planarization for ULSI Multilevel Interconnection Conference (CMP-MIC), Jan. 1, 2007, pp. 465-472.

International Search Report and Written Opinion—PCT/US2010/020911—International Search Authority—European Patent Office, Apr. 1, 2010.

* cited by examiner

*Primary Examiner* — Suchin Parihar
(74) *Attorney, Agent, or Firm* — Sam Talpalatsky; Nicholas J. Pauley; Jonathan T. Velasco (57) ABSTRACT

Metal is deleted from portions of metal wires in an integrated circuit layout, based upon a width of the metal wires. Preliminary cutting forms having a length and a width are inserted with a first orientation in the portions of metal wire. It is determined if the width of each of the preliminary cutting forms is parallel to a width of the metal wire portions where the preliminary cutting forms are inserted. If the preliminary cutting forms have width parallel to the width of the metal wire portion, the preliminary cutting forms become part of a cutting form final layout. Cutting forms not having widths parallel to the width of the metal wire portions are removed. Cutting forms at different orientations are then inserted where the prior cutting forms were removed from and the process repeats until all portions of the metal wire have cutting forms inserted parallel to the current flow direction.

23 Claims, 6 Drawing Sheets

GENERATING CUTTING FORMS ALONG CURRENT FLOW DIRECTION IN A CIRCUIT LAYOUT

FIELD OF DISCLOSURE

The embodiments disclosed herein relate generally to manufacturing technologies for electronic circuits and, more specifically, to a method and apparatus for generating cutting forms in a circuit layout.

BACKGROUND

In integrated circuit (IC) layout, wide wires (for example, wider than ten microns) are designed for carrying large electrical current. For example, power buses are usually wide metal wires formed from copper or aluminum to obtain low resistance. However, in the course of manufacturing, a chemical mechanical polishing (CMP) process to planarize the metal layers and other portions of the circuit often produce concave "dishing" in the metal surface, where dishing is more severe where the metal wire is wider. That is, when polished, the center part of the surface of the embedded metal wire forms a "dish-like" profile where the thickness of the metal wiring is reduced at the center. Furthermore, CMP heavily depends on the metal width and density. Metal dishing is more serious for larger line widths and where portions of an integrated circuit have a high area fraction containing metallization.

To remedy this problem, shapes ("cutting forms") in the form of polygons (e.g., rectangular slots) are placed into metal wires during design layout to indicate where to cut holes within the metal wire pattern. The holes lead to a reduction of the effective metal width and area density in any local region, breaking up the larger expanse of the metal wire width, and reducing dishing effects, thus limiting the thinning of the metal wire. When adding the cutting forms in the shape of elongated slots, it is highly desirable to place the long dimension of the cutting forms parallel to the direction of electrical current flow. This is done to facilitate the current flow and therefore reduce the effect of electromigration, a cause of increased path resistance, conductivity degradation and failure.

Conventionally, cutting forms are added into a layout manually. This can be a time consuming process. Another method may include inserting the rectangles into wide metals using a conventional programmed script. A limitation of this method is that the added rectangles may not always be laid out parallel with the current flow direction, particularly when the metal wire turns a corner and the direction of current flow changes. Consequently, manual intervention and modification is involved to correct the orientation of added rectangular slots.

There is a need, then, for an automated method of laying out cutting forms correctly oriented along the current flow direction of the metal wire.

SUMMARY

A method of inserting cutting forms in metal wires in a circuit layout is disclosed. The method identifies wires wide enough to determine when to insert cutting forms, i.e., the removal of metal sections in strips from portions of wide metal wire, where the cutting form strips are oriented with the long direction parallel to the direction of current flow.

A method for generating a cutting form layout including cutting forms for deleting metal along a current flow direction in an integrated circuit layout includes identifying a metal wire in the integrated circuit layout to receive the cutting forms. The metal wire includes at least one metal wire portion having a portion length edge and portion width edge. A first group of preliminary cutting forms with a first orientation are inserted within the at least one portion of the metal wire. Each of the first group of preliminary cutting forms has a width edge, and a length edge longer than the width edge. It is determined if the width edge of each of the first group of preliminary cutting forms is substantially parallel to the width edge of a corresponding portion in which the group of preliminary cutting forms are inserted. Any of the first group of preliminary cutting forms not having the width edge substantially parallel to the width edge of the corresponding metal wire portion are removed. The first group of preliminary cutting forms having width edges determined as substantially parallel to the width edge of the corresponding metal wire portion are defined as final cutting forms.

A computer program product for generating cutting forms for deleting metal along a current flow direction in an integrated circuit layout, includes a computer-readable medium comprising code for causing a computer to identify a metal wire in the integrated circuit layout to receive the cutting forms. The metal wire has at least one metal wire portion having a portion length edge and portion width edge The medium also includes code for causing a computer to insert with a first orientation preliminary cutting forms within the at least one portion of the metal wire. Each of the plurality of preliminary cutting forms has a width edge, and a length edge longer than the width edge. The medium further includes code for causing a computer to determine if the width edge of each of the preliminary cutting forms is substantially parallel to the width edge of a corresponding portion in which the preliminary cutting forms are inserted. The medium also includes code for causing a computer to remove any of the preliminary cutting forms not having the width edge substantially parallel to the width edge of the corresponding metal wire portion. The medium also has code for causing a computer to define as final cutting forms the preliminary cutting forms having width edges determined as substantially parallel to the width edge of the corresponding metal wire portion.

A computer system includes a memory and a processor that identify a metal wire in the integrated circuit layout to receive the cutting forms. The metal wire has at least one metal wire portion having a portion length edge and a portion width edge. The memory and processor insert with a first orientation of preliminary cutting forms within the at least one portion of the metal wire, each of preliminary cutting forms having a width edge and a length edge longer than the width edge. The memory and processor determine if the width edge of each of the preliminary cutting forms is substantially parallel to the width edge of the corresponding portion in which the preliminary cutting forms are inserted. The memory and processor remove any of the preliminary cutting forms not having the width edge substantially parallel to the portion width edge of the corresponding metal wire portion; and define as final cutting forms the preliminary cutting forms having width edges determined as substantially parallel to the width edge of the corresponding metal wire portion.

In another aspect, a system generates a cutting form layout including cutting forms for deleting metal along a current flow direction in an integrated circuit layout. The system includes means for identifying a metal wire in the integrated circuit layout to receive the cutting forms. The metal wire has at least one metal wire portion having a length edge and width edge. The system also has means for inserting with a first orientation preliminary cutting forms within the at least one portion of the metal wire. Each of the preliminary cutting forms has a width edge, and a length edge longer than the width edge. The system further includes means for determining if the width edge of each of the preliminary cutting forms is substantially parallel to a width edge of a corresponding portion in which the preliminary cutting forms are inserted. The system also has means for removing any of the preliminary cutting forms not having a width edge substantially parallel to the width edge of the corresponding metal wire portion. The system also includes means for defining as final cutting forms the preliminary cutting forms having width edges determined as substantially parallel to the width edge of the corresponding metal wire portion.

The foregoing has outlined rather broadly the features and technical advantages of the present disclosure in order that the detailed description of embodiments of the disclosure that follows may be better understood. Additional features and advantages of the disclosure will be described hereinafter which form the subject of the claims of the disclosure. It should be appreciated by those skilled in the art that the conception and specific embodiments disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION

A method is disclosed to generate cutting forms within metal interconnect wires, wherein the cutting forms are arranged in parallel with the current flow direction. In an embodiment, a methodology places the long dimension of a cutting form parallel with the length edge of the metal wire portion. This is equivalent to aligning the smaller dimensioned width edge of the cutting form to be substantially parallel to a width dimension of the metal wire. In one embodiment, the metal wire portion in which the cutting form is placed may be represented by piece-wise rectangles, where the larger dimension is in the direction of current flow. The width dimension of the piece-wise rectangle of the metal wire portion is an edge that may be referred to as the metal wire portion width edge.

In an embodiment of the disclosed method, the width edge of a cutting form added to the metal wire portion of the layout and the width of the metal wire portion are identified and compared. Multiple cutting forms may be placed throughout the entire metal wire layout and then individually evaluated. If the cutting form width edge is parallel to the metal wire portion width edge, the cutting form is determined to be aligned in parallel with the electric current flow direction and is retained. Cutting forms not aligned in parallel with the electric current flow direction are withdrawn. Then, alternative arrangements of cutting forms (e.g., at ±45 degrees, ±90 degrees or another selected angle to the original of the previously added cutting forms) may be inserted where cutting forms are not presently disposed, and the cutting form width edge and the metal wire portion width edge direction are identified and compared, as before. When the inserted cutting forms so placed with a changed orientation in the piece-wise portion of the metal wire are aligned in parallel with the electric current flow direction and having the cutting form width edges being parallel to the metal wire portion width edge direction, they are retained. Other cutting forms not satisfying the insertion criteria are again discarded.

The process is repeated until all cutting forms placed within all metal wire portions are arranged with the long dimension of the cutting forms parallel to the current flow directions in all portions of the metal wire. As the direction of the metal wire changes because of wire routing procedures, the cutouts are continuously compared to the orientation of the piece-wise portions of the metal wire to establish the direction of additional cutting forms. The method may be applied to metal wires laid out in a variety of patterns.

The inserted cutting forms may be placed in a staggered pattern. For example, columns of cutting forms may be inserted in a straight portion of the metal wire with adjacent columns shifted relative to each other along the direction of current flow. This may improve the uniformity of coupled parasitic capacitance between adjacent layers of metal wires that may cross or overlap.

Figure 1:
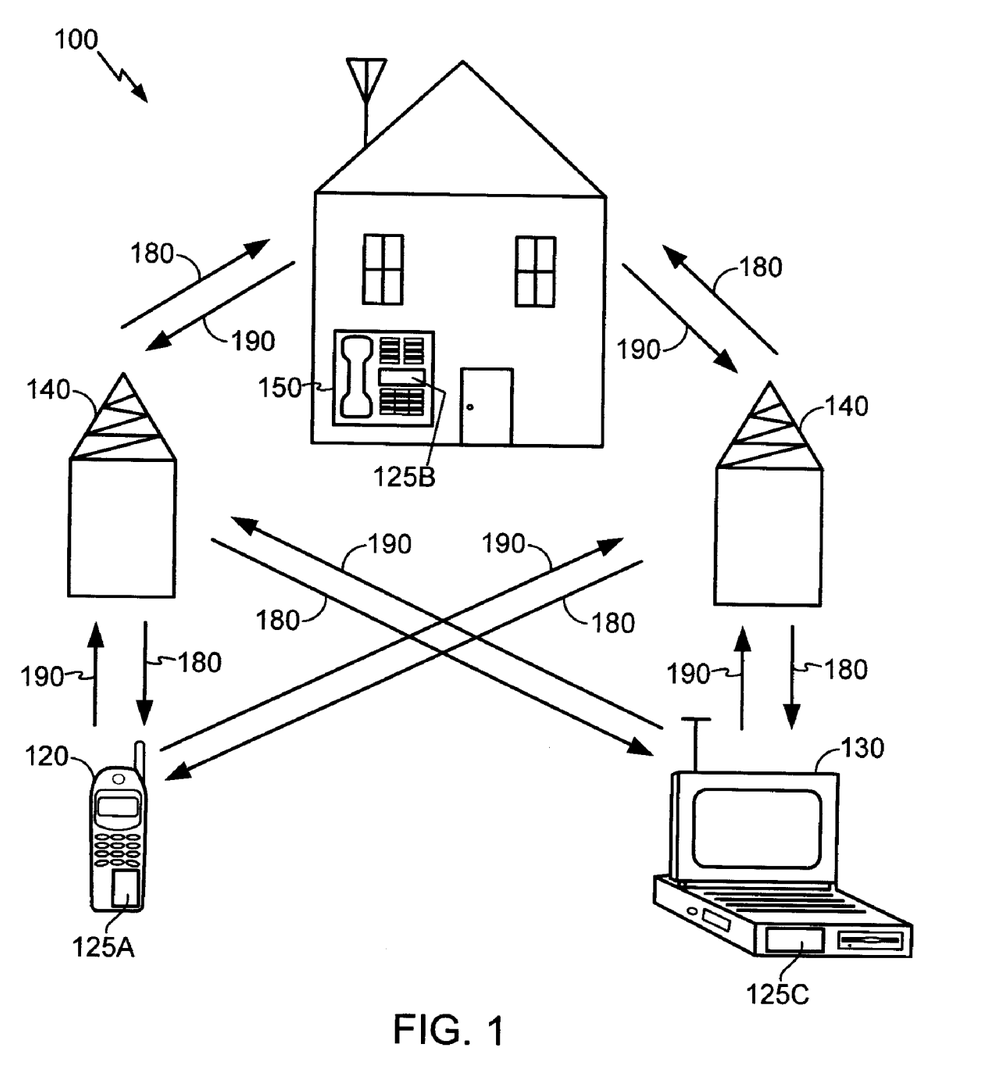
FIG. 1 shows an exemplary wireless communication system in which an embodiment of the disclosure may be advantageously employed.

FIG. 1 shows an exemplary wireless communication system 100 in which an embodiment of the disclosure may be advantageously employed. For purposes of illustration, FIG. 1 shows three remote units 120, 130, and 150 and two base stations 140. It will be recognized that typical wireless communication systems may have many more remote units and base stations. Remote units 120, 130, and 150 include powered integrated circuit devices 125A, 125B, and 125C, respectively, which utilize embodiments of the disclosure as discussed further below. FIG. 1 shows forward link signals 180 from the base stations 140 and the remote units 120, 130, and 150 and reverse link signals 190 from the remote units 120, 130, and 150 to base stations 140.

In FIG. 1, a remote unit 120 is shown as a mobile telephone, remote unit 130 is shown as a portable computer, and the remote unit 150 is shown as a fixed location remote unit in a wireless local loop system. For example, the remote units may be cell phones, hand-held personal communication systems (PCS) units, portable data units such as personal data assistants, or fixed location data units such as meter reading equipment. Although FIG. 1 illustrates remote units according to embodiments taught in the disclosure, the disclosure is not limited to these exemplary illustrated units. Embodiments of the disclosure may be suitably employed in any device which includes active integrated circuitry including metal interconnect wires, for example, in power distribution.

Figure 2:
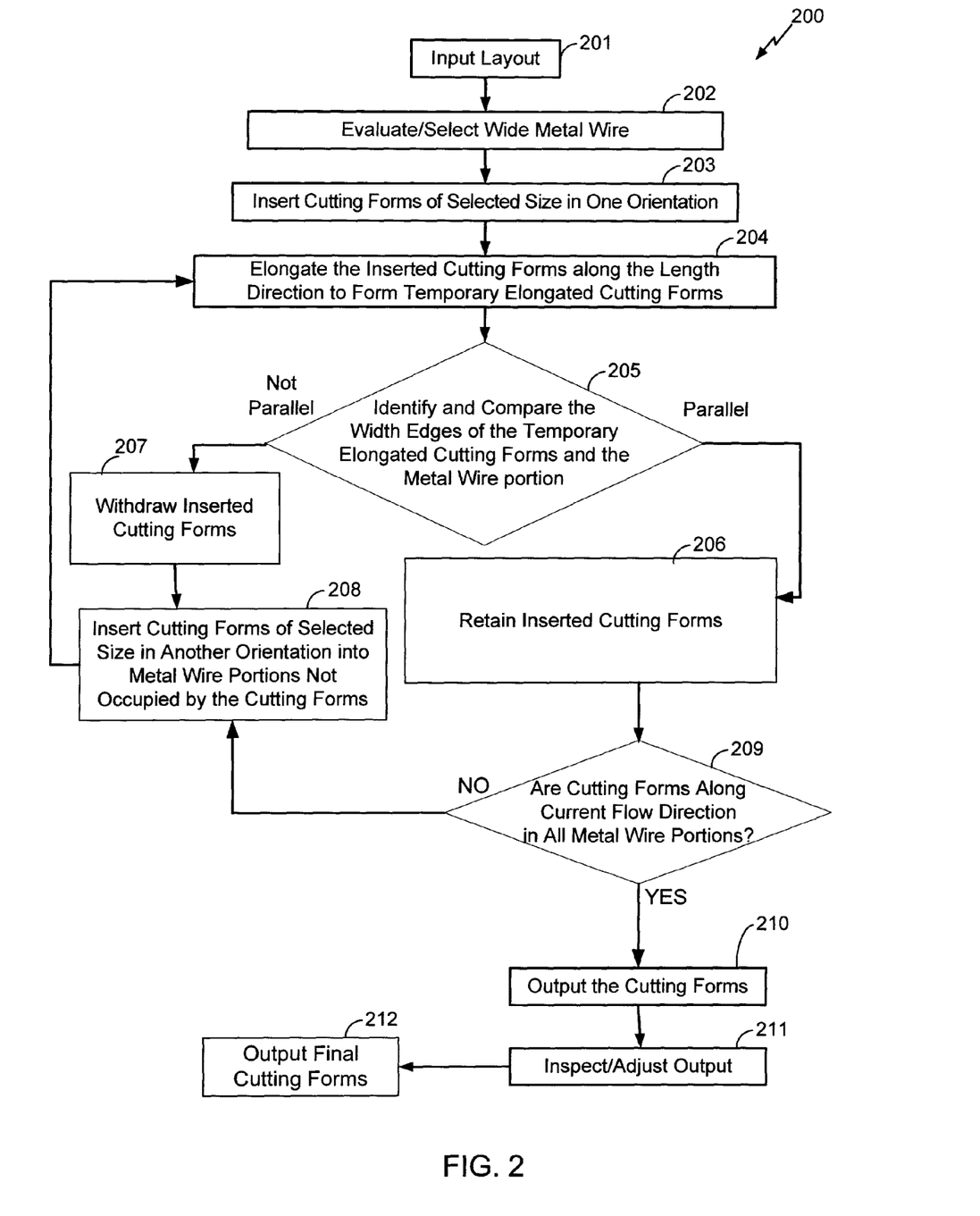
FIG. 2 is a flow diagram illustrating a method for generating cutting forms along the current flow direction in a design layout according to an embodiment of the disclosure.
Figure 3:
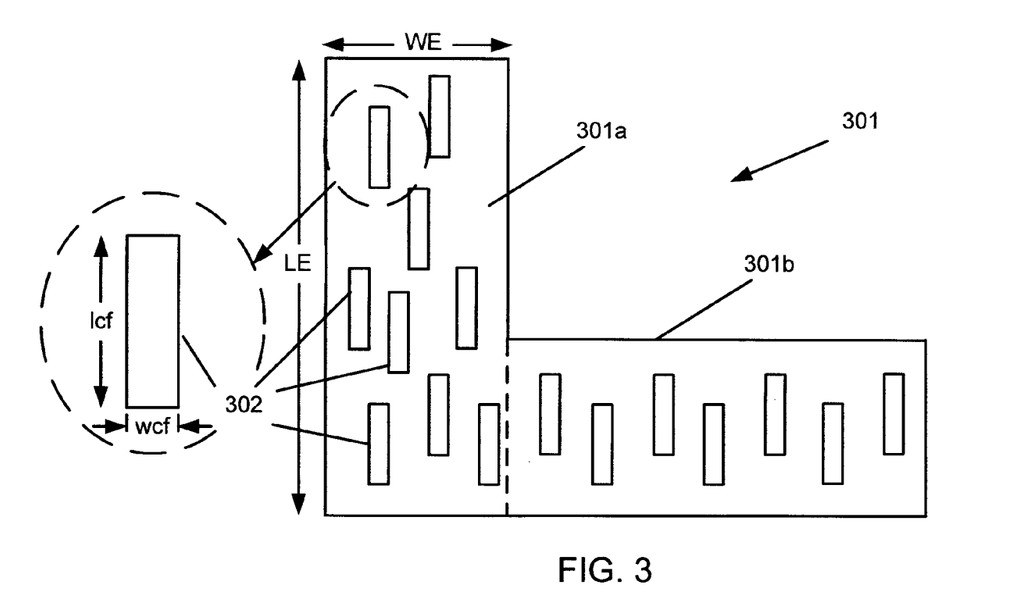
FIGS. 3-9 illustrate various stages of a method of placing cutting forms according to an embodiment of the disclosure shown in FIG. 2.

FIG. 2 is a flow diagram illustrating one embodiment of a method for generating cutting forms along the current flow direction in a circuit design layout. FIGS. 3-9 illustrate various stages of placing cutting forms according to the method of FIG. 2. Referring to FIGS. 2 and 3, the method 200 begins with inputting data to specify a layout (Block 201) for one or more portions of a metal wire 301 (e.g., metal wire portions 301a, 301b, etc.). In this example, a portion of the metal wire 301 may be the rectangular metal wire portion 301a. Layout data is evaluated to identify and select which wires in the layout are wide enough to merit insertion of cutting forms. (Block 202). For example, if a wire has a width less than a selected range of wire widths, e.g., less than about 10 µm, it may not have cutting forms inserted. Those wires having a width in the selected range have cutting forms inserted. The identification of the length of the portion 301a may be determined in the evaluation by the length being greater than the width of the portion 301a. A width edge orientation WE and a length edge orientation LE may be defined on the basis of the identified width and length of the metal wire portion (e.g., 301a).

When a given segment 301a is determined to be wide enough to include cutting forms, preliminary first cutting forms 302 of a selected size (e.g., rectangles having a first cutting form length dimension $l_{cf}$ and width dimension $w_{cf}$) are inserted throughout the metal wire 301, aligned in one orientation (Block 203). While the preliminary cutting forms 302 may be placed throughout all portions of the metal wire, the preliminary cutting forms 302 will be evaluated according to criteria determined by one portion, e.g., portion 301a. In other words, the evaluation is performed portion by portion.

In one embodiment the cutting forms 302 are placed in a staggered pattern. Furthermore, the staggered pattern of the placement of the cutting forms 302 may be random or periodic, provided the cutting forms 302 do not overlap. In one embodiment, the cutting forms 302 may be placed in a uniform rectangular array pattern.

The orientation may be arbitrarily chosen. In one embodiment, the cutting forms 302 are arranged at angles of zero degrees, ±45 degrees, ±90 degrees and ±135 degrees with respect to the layout horizontal (i.e., x) direction. Of course other angles may also be specified.

A selected length dimension $l_{cf}$ and a selected width dimension $w_{cf}$ of the cutting forms 302 may be arbitrarily chosen, wherein the dimension $l_{cf}$ is customarily greater than the width dimension $w_{cf}$. The cutting forms 302 may uniformly have the same dimensions, $l_{cf}$ and $w_{cf}$, or these dimensions may be varied from one cutting form placement to another, e.g., from one portion to another portion of the metal wire 301.

Figure 4:
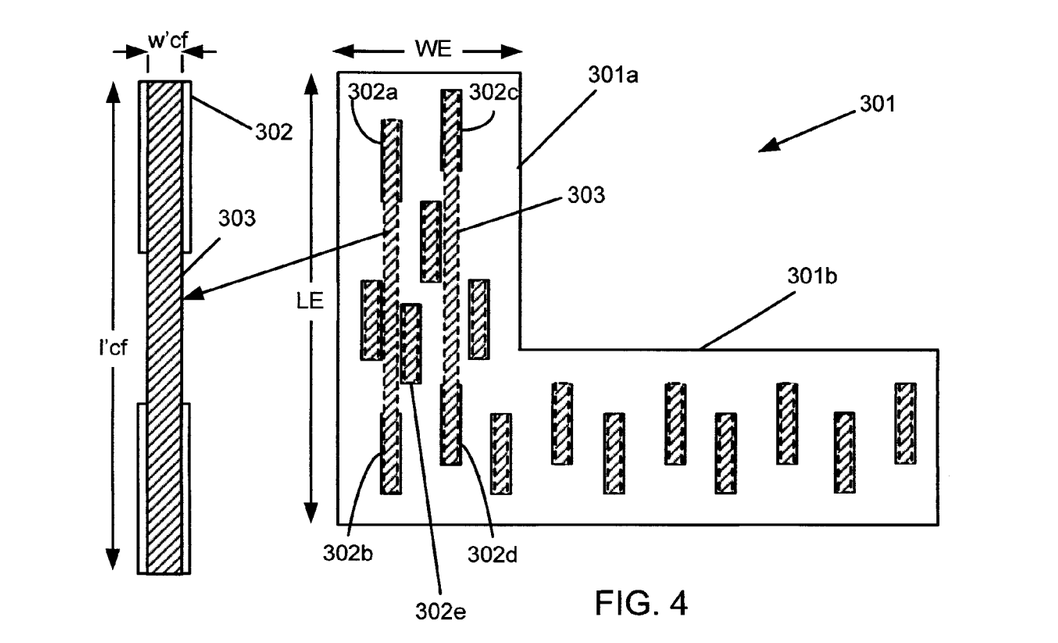

In order to reduce calculations, in one embodiment it is determined which cutting forms 301 are arranged in a column with other cutting forms. Thus, the calculation can be performed for the entire column of preliminary cutting forms at one time. Referring to FIG. 2 and FIG. 4, an example of the procedure will now be described. Preliminary cutting forms 302a and 302b are considered to be in the same column. Preliminary cutting forms 302c and 302d are considered to be in another column. Preliminary cutting form 302e defines a column not having any other preliminary cutting forms.

Based on the inserted preliminary cutting forms 302a,b,c, d, temporary columnar cutting forms 303 may be defined in the following manner: The temporary columnar cutting forms 303 are shaped by having the length dimension $l_{cf}$ elongated to a length $l'_{cf}$. Additionally, the width dimension $w_{cf}$ of the preliminary cutting forms 302a,b,c,d are reduced to $w'_{cf}$ by a specified amount (e.g., 5 nm). The reduced width dimension $w'_{cf}$ of the temporary columnar cutting forms 303 ensures the temporary columnar cutting forms 303 do not overlap a preliminary cutting form 302 in an adjacent column.

Figure 5:
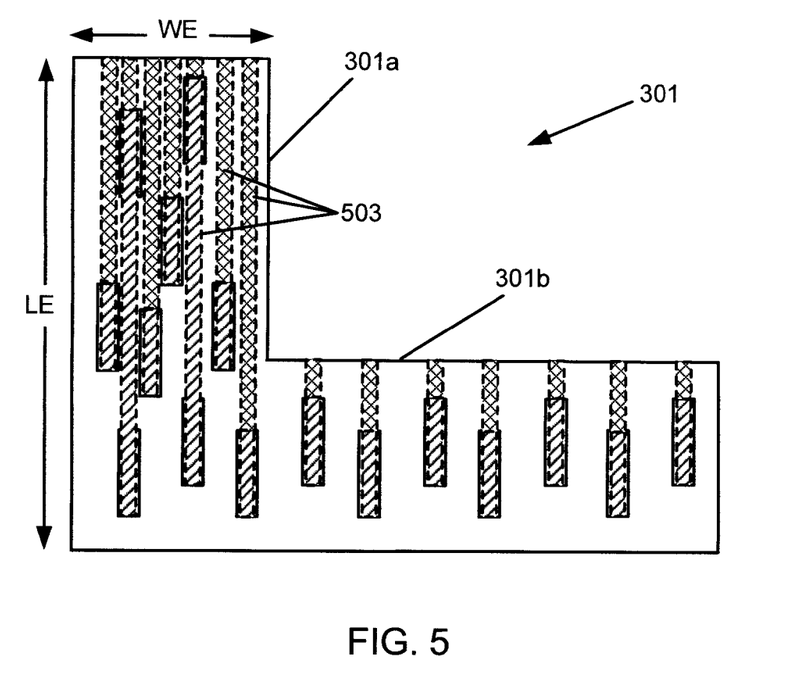

Next it is evaluated whether the preliminary cutting forms 302 are oriented parallel to the direction of current flow. If there are multiple preliminary cutting forms 302 within a single column, the evaluation can occur with respect to the entire column. In this case, the temporary columnar cutting forms' length $l'_{cf}$ may be extended until it touches an edge of the metal wire segment 301a, as shown in FIG. 5. Similarly, in columns having only a single preliminary cutting form 302 (e.g., 302e), the single preliminary cutting forms 302 are extended until touching an edge of the wire metal segment 301a, as shown in FIG. 5 (Block 204). These extended temporary columnar cutting forms and the extended preliminary cutting forms will be collectively referred to as temporary elongated cutting forms 503.

The orientation of the width edge of each of the newly formed temporary elongated cutting forms 503 is identified and compared to the width edge orientation WE of each portion of the metal wire 301 (e.g., 301a, 301b, etc.) (Block 205). The comparison determines whether the width edges of each of the temporary elongated cutting forms 503 are substantially parallel to the width edge orientation WE of each portion of the metal wire 301. Temporary elongated cutting forms 503 having width edges $w'_{cf}$ substantially parallel to the orientation WE of the metal wire segment 301a are identified in Block 205. When this criterion is met by any of the temporary elongated cutting forms 503, this indicates that the preliminary cutting forms corresponding to the temporary elongated cutting forms 503 are substantially aligned in the current flow direction, i.e., parallel to the length orientation LE of the portion 301a. Temporary elongated cutting forms 503 not aligned in the current flow direction by having width edges (of dimension $w'_{cf}$) not substantially parallel to the width edge orientation WE of the portion 301a of the metal wire 301 are determined not to be parallel to the direction of current flow in that portion 301a (Block 207).

Figure 6:
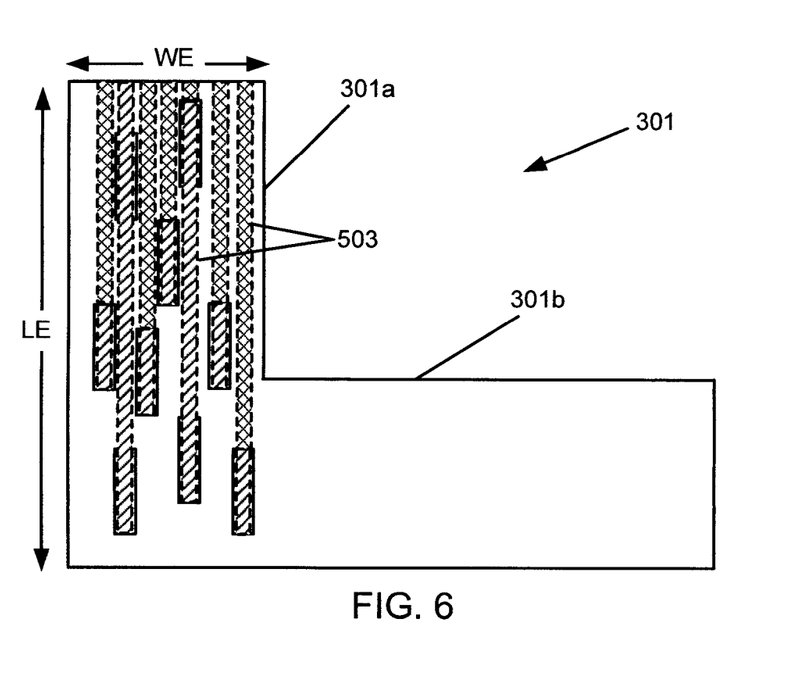
Figure 7:
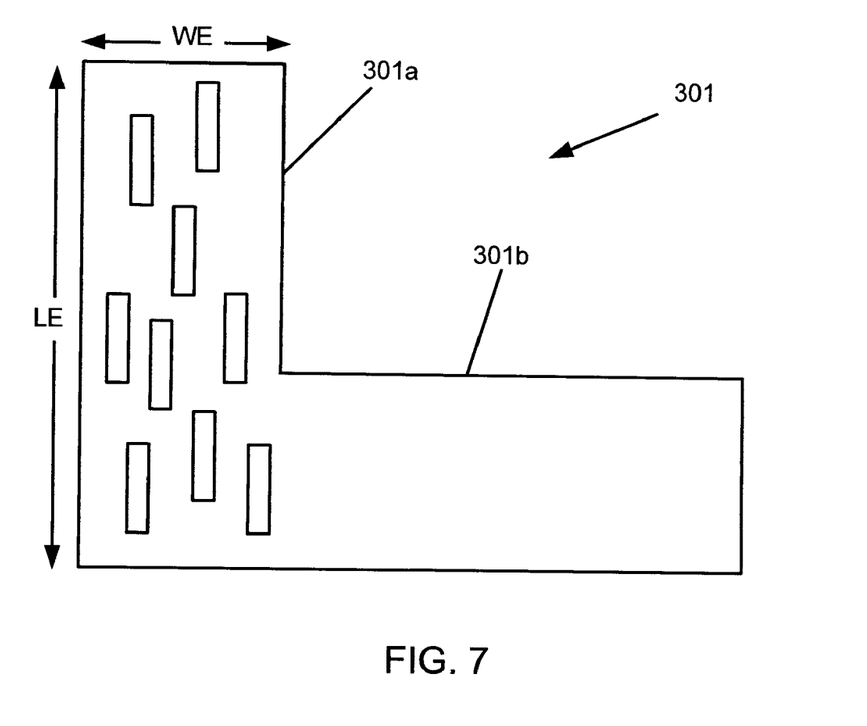

When the temporary elongated cutting forms 503 do meet the criterion of Block 205, the preliminary cutting forms 302, corresponding to the temporary elongated cutting forms 303 are retained (Block 206). The preliminary cutting forms 302 subsumed by the temporary elongated cutting forms 503 not meeting the criteria of Block 205 are withdrawn from placement (Block 207). As seen in FIG. 6, in the illustrated example, the preliminary cutting forms 302 are withdrawn from the portion 301b of the metal wire 301. All of the temporary elongated cutting forms 503 are also withdrawn, as they serve the purpose substantially to identify which preliminary cutting forms 302 are to be retained (FIG. 7).

Figure 8:
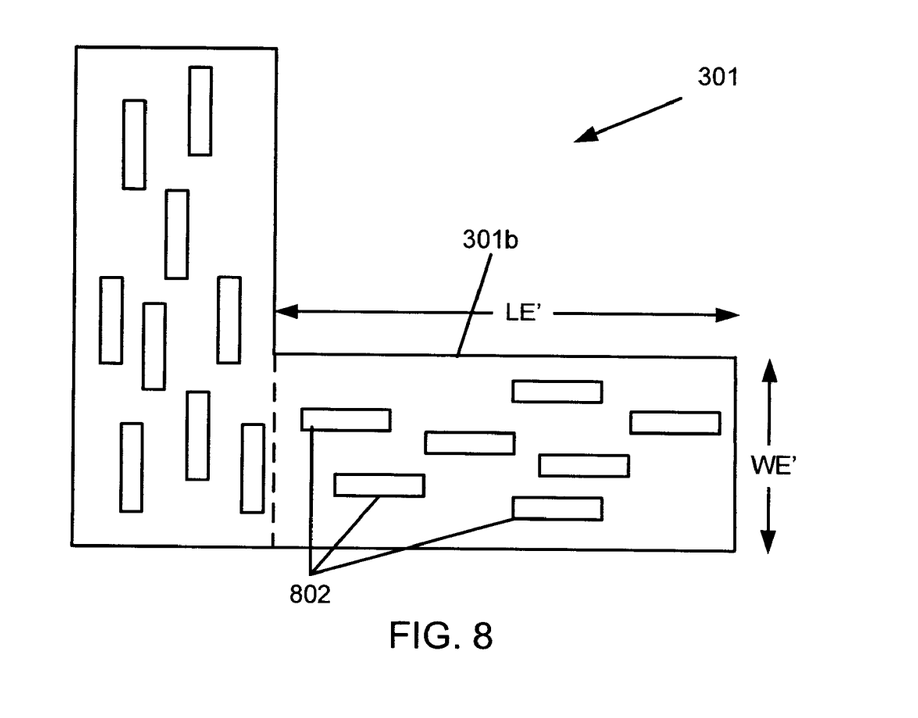

In those portions of the metal wire 301 from which the preliminary cutting forms 302 have been removed (the portion 301b in this example), new preliminary cutting forms 802 of a selected size are inserted with a different orientation from the previous preliminary cutting forms 302 (Block 208) as illustrated in FIG. 8. In an embodiment, the orientation of the new preliminary cutting forms 802 may be, for example, at an angle of ±45 degree, ±90 degrees, or another orientation that may correspond to layout orientations and/or current flow directions for the various portions of the metal wire 301.

Figure 9:
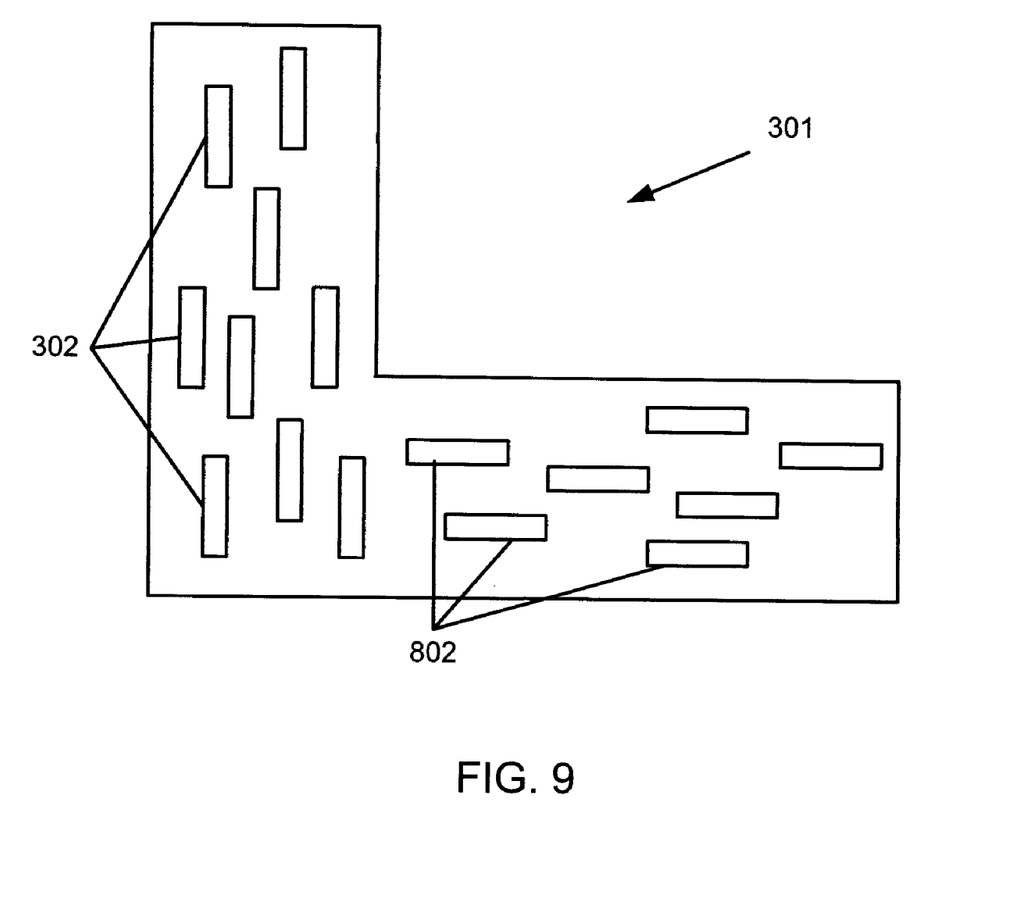

After inserting the new preliminary cutting forms 802 (in Block 208), the method 200 then returns to Block 204, repeating Blocks 204, 205, 206, 207 and 208 until all portions of the metal wire have preliminary cutting forms 302, 802 satisfactorily placed with the long dimension parallel to the direction of current flow (FIG. 9). Thus, when a portion of the metal wire 301 has retained preliminary cutting forms (302, 802, etc.) placed with the length dimension parallel to the current direction, it is determined whether all metal wire portions have cutting forms inserted properly (Decision Block 209). If the result of Decision Block 209 is that insertion of cutting forms in all portions of the metal wire 301 is not complete (Block 209: No), the method 200 returns to Block 208 to place more preliminary cutting forms 802 in vacant portions of the metal wire 301.

If all portions of the metal wire 301 have preliminary cutting forms (e.g., 302, 802,) placed and properly aligned (Block 209: YES), then the preliminary cutting forms are defined as final cutting forms and a preliminary cutting form layout is output, with the final cutting forms having the dimensions and orientations of the preliminary cutting forms 302, 802 (Block 210).

The preliminary cutting form output may then be inspected to determine if additional adjustments are appropriate (Block 211), for example when a placement conflict arises. Final adjustments may be provided by an automated procedure in which various specified conditions may be met, or the final adjustments may be in response to visual inspection according to various specified conditions. A final placement of cutting forms is provided after adjustment (Block 212).

In the event that a circuit design includes multiple metallized layers, wherein each layer includes metal wires, the method 200 may be applied for each layer. In multi-layer metallizations including metal wires in the multiple layers, dielectric interlayers may electrically insulate two adjacent metallization layers that cross or overlap. In the case where the metal wires in two adjacent metallization layers remain insulated, the cutting forms may be staggered as described above to provide a substantially uniform inter-layer capacitance between the two metal wires. In one embodiment, where the metal wires in two adjacent metallization layers are interconnected by metal-filled vias through the interlayer dielectric, the method 200 is not applied in the overlapping interconnect region, so the placement of cutting forms does not interfere with the vias.

It will be appreciated that the method set forth automates the process of placing cutting forms in a metal wire, with the benefit of reducing metallization dishing effects (i.e., that reduce the thickness in the center portion of metal wire traces) by breaking up extended areas of metallization. Additionally, where such metal wires serve to carry high current densities for purposes of supplying power to circuitry, the cutting forms in metal wire traces may also be placed (e.g., staggered) to limit growth of electromigration effects, which otherwise contribute to increased wire resistance, causing localized heating and failure over time.

The methodologies described herein may be implemented by various means depending upon the application. For example, these methodologies may be implemented in hardware, firmware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, or other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory, for example the memory of a mobile station, and executed by a processor, for example the microprocessor of a modem. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

Although the present disclosure and its advantages have been described in detail, it should be understood that various changes, substitutions and alterations can be made herein without departing from the spirit and scope of the disclosure as defined by the appended claims. For example, although the preceding description was with respect to inserting cutting forms in wide metal wires, the disclosed methods and structures may be used whenever it is desirable to design a layout with a preferred orientation for selected features. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for generating a cutting form layout including cutting forms for deleting metal along a current flow direction in an integrated circuit layout, comprising:

using a computer, identifying a metal wire in the integrated circuit layout to receive the cutting forms, the metal wire comprising at least one metal wire portion having a portion length edge and portion width edge;

inserting with a first orientation a first plurality of preliminary cutting forms within the at least one portion of the metal wire, each of the first plurality of preliminary cutting forms having a width edge, and a length edge longer than the width edge;

determining if the width edge of each of the first plurality of preliminary cutting forms is substantially parallel to a width edge of a corresponding portion in which the first plurality of preliminary cutting forms are inserted;

removing any of the first plurality of preliminary cutting forms not having a width edge substantially parallel to the width edge of the corresponding metal wire portion; and defining as final cutting forms the first plurality of preliminary cutting forms having width edges determined as substantially parallel to the width edge of the corresponding metal wire portion.

2. The method of claim 1, further comprising:

inserting within the metal wire at a portion where the plurality of preliminary cutting forms have been removed a second plurality of preliminary cutting forms having a second orientation, a length and a width;

determining if the width edge of each of the second plurality of preliminary cutting forms is substantially parallel to a width edge of a corresponding portion in which the second plurality of preliminary cutting forms are inserted;

removing any of the second plurality of preliminary cutting forms not having a width edge substantially parallel to the width edge of the corresponding metal wire portion; and defining as final cutting forms the second plurality of preliminary cutting forms having width edges determined as substantially parallel to the width edge of the corresponding metal wire portion.

3. The method of claim 1, in which the identifying further comprises:
identifying the metal wire portion to receive inserted cutting forms by comparing a metal wire width to a selected width value.

4. The method of claim 1, further comprising forming a plurality of elongated temporary cutting forms by extending the length of some of the first plurality of preliminary cutting forms along a length direction of the first preliminary cutting forms so each elongated temporary cutting form at least partially overlaps with at least one other of the first preliminary cutting forms and/or touches an edge of the corresponding metal wire portion.

5. The method of claim 4, further comprising reducing the width of the first plurality of the preliminary cutting forms.

6. The method of claim 2, further comprising forming a plurality of elongated temporary cutting forms by extending the length of some of the second plurality of preliminary cutting forms along a direction of the metal length so each elongated temporary cutting form at least partially overlaps with at least one other of the second preliminary cutting forms and/or touches an edge of the corresponding metal wire portion.

7. The method of claim 6, further comprising reducing the width of the second plurality of the preliminary cutting forms.

8. The method of claim 1, further comprising outputting a location and orientation associated with the final cutting forms.

9. The method of claim 8, further comprising:
adjusting the layout of the final cutting forms according to selected rules; and
outputting a final layout.

10. A computer program product for generating cutting forms for deleting metal along a current flow direction in an integrated circuit layout, comprising:
a non-transitory computer-readable medium comprising computer-executable code for causing a computer to implement a plurality of functions comprising:
code for causing a computer to identify a metal wire in the integrated circuit layout to receive the cutting forms, the metal wire comprising at least one metal wire portion having a portion length edge and portion width edge;
code for causing a computer to insert with a first orientation a first plurality of preliminary cutting forms within the at least one portion of the metal wire, each of the first plurality of preliminary cutting forms having a width edge, and a length edge longer than the width edge;
code for causing a computer to determine if the width edge of each of the plurality of preliminary cutting forms is substantially parallel to a width edge of a corresponding portion in which the first plurality of preliminary cutting forms are inserted;
code for causing a computer to remove any of the first plurality of preliminary cutting forms not having a width edge substantially parallel to the width edge of the corresponding metal wire portion; and
code for causing a computer to define as final cutting forms the first plurality of preliminary cutting forms having width edges determined as substantially parallel to the width edge of the corresponding metal wire portion.

11. The computer-readable medium of claim 10, further comprising:
code for causing a computer to insert within the metal wire at a portion where the plurality of preliminary cutting forms have been removed a second plurality of preliminary cutting forms having a second orientation, a length and a width;
code for causing a computer to determine if the width edge of each of the second plurality of preliminary cutting forms is substantially parallel to a width edge of a corresponding portion in which the second plurality of preliminary cutting forms are inserted;
code for causing a computer to remove any of the second plurality of preliminary cutting forms not having a width edge substantially parallel to the width edge of the corresponding metal wire portion; and
code for causing a computer to define as final cutting forms the second plurality of preliminary cutting forms having width edges determined as substantially parallel to the width edge of the corresponding metal wire portion.

12. The computer-readable medium of claim 10, further comprising:
code for causing a computer to identify the metal wire portion to receive inserted cutting forms by comparing a metal wire width to a selected width value.

13. The computer-readable medium of claim 12, further comprising code for causing a computer to form a plurality of elongated temporary cutting forms by extending the length of some of the first plurality of preliminary cutting forms along a length direction of the first preliminary cutting forms so each elongated temporary cutting form at least partially overlaps with at least one other of the first preliminary cutting forms and/or touches an edge of the corresponding metal wire portion.

14. The computer-readable medium of claim 13, further comprising code for causing a computer to reduce the width of the first plurality of the preliminary cutting forms.

15. The computer-readable medium of claim 11, further comprising code for causing a computer to form a plurality of elongated temporary cutting forms by extending the length of some of the second plurality of preliminary cutting forms along a direction of the metal length so each elongated temporary cutting form at least partially overlaps with at least one other of the second preliminary cutting forms and/or touches an edge of the corresponding metal wire portion.

16. The computer-readable medium of claim 15, further comprising code for causing a computer to reduce the width of the second plurality of the preliminary cutting forms.

17. The computer-readable medium of claim 10, further comprising code for causing a computer to output a location and orientation associated with the final cutting forms.

18. The computer-readable medium of claim 17, further comprising code for causing a computer to adjust the layout of the final cutting forms according to selected rules; and
outputting a final layout.

19. A computer system, comprising:
a memory and a processor that:
identify a metal wire in the integrated circuit layout to receive the cutting forms, the metal wire comprising at least one metal wire portion having a portion length edge and portion width edge;
insert with a first orientation a first plurality of preliminary cutting forms within the at least one portion of the metal wire, each of the first plurality of preliminary cutting forms having a width edge, and a length edge longer than the width edge;
determine if the width edge of each of the first plurality of preliminary cutting forms is substantially parallel to a width edge of a corresponding portion in which the first plurality of preliminary cutting forms are inserted;

remove any of the first plurality of preliminary cutting forms not having a width edge substantially parallel to the width edge of the corresponding metal wire portion; and define as final cutting forms the first plurality of preliminary cutting forms having width edges determined as substantially parallel to the width edge of the corresponding metal wire portion.

20. The system of claim 19, in which the memory and processor identify the metal wire portion to receive inserted cutting forms by comparing a metal wire width to a selected width value.

21. The system of claim 19, in which the memory and processor insert within the metal wire at a portion where the first plurality of preliminary cutting forms have been removed a second plurality of preliminary cutting forms having a second orientation, a length and a width; determine whether second plurality of preliminary cutting forms are substantially parallel to a width edge of a corresponding portion in which the second plurality of preliminary cutting forms are inserted; remove any of the second plurality of preliminary cutting forms not having a width edge substantially parallel to the width edge of the corresponding metal wire portion; and define as final cutting forms the second plurality of preliminary cutting forms having width edges determined as substantially parallel to the width edge of the corresponding metal wire portion.

22. The system of claim 19, in which the memory and processor adjust the layout of the final cutting forms according to selected rules and output a final layout.

23. A system for generating a cutting form layout including cutting forms for deleting metal along a current flow direction in an integrated circuit layout, comprising:

means for identifying a metal wire in the integrated circuit layout to receive the cutting forms, the metal wire comprising at least one metal wire portion having a portion length edge and portion width edge;

means for inserting with a first orientation a plurality of preliminary cutting forms within the at least one portion of the metal wire, each of the plurality of preliminary cutting forms having a width edge, and a length edge longer than the width edge;

means for determining if the width edge of each of the plurality of preliminary cutting forms is substantially parallel to a width edge of a corresponding portion in which the plurality of preliminary cutting forms are inserted;

means for removing any of the plurality of preliminary cutting forms not having a width edge substantially parallel to the width edge of the corresponding metal wire portion; and means for defining as final cutting forms the plurality of preliminary cutting forms having width edges determined as substantially parallel to the width edge of the corresponding metal wire portion.

* * * * *